United States Patent [19]
Chesley

[11] Patent Number: 5,173,700
[45] Date of Patent: Dec. 22, 1992

[54] MAINBEAM JAMMER NULLING WITH MONOPULSE ANGLE CORRECTION

[75] Inventor: Donald E. Chesley, Maple Shade, N.J.

[73] Assignee: General Electric Co., Moorestown, N.J.

[21] Appl. No.: 845,023

[22] Filed: Mar. 3, 1992

[51] Int. Cl.$^5$ .............................................. G01S 7/36
[52] U.S. Cl. ...................................... 342/17; 342/149
[58] Field of Search ............... 342/16, 17, 149, 379, 342/382

[56] References Cited

PUBLICATIONS

"Adaptive Main-Beam Nulling for Narrow-Beam Antenna Arrays", Adams et al., IEEE Transactions on Aerospace and Electronic Systems, Jul. 1980, pp. 509-516, vol. AFS-16, No. 4.

"A High Resolution Target-Tracking Concept Using Spectral Estimation Techniques", Gabriel, May 31, 1984.

*Primary Examiner*—T. H. Tubbesing
*Attorney, Agent, or Firm*—William H. Meise; Stephen A. Young; Nieves, Carlos A.

[57] ABSTRACT

A monopulse radar system includes sum and difference receivers, and an auxiliary receive beam offset from the sum and difference beam axis. The received sum and difference signals are processed to produce first and second weighting signals which, when multiplied by the auxiliary signal, produce first and second weighted auxiliary signals which are approximately equal to the magnitude of, and are in a particular phase with, the received sum and difference signals, respectively. In the presence of a jamming signal in the main lobe of the monopulse receiver, the weighted auxiliary signals are summed with the sum and difference signals to produce adapted sum and difference signals, in which the jammer signal is suppressed by a null in the effective receive antenna pattern. The null perturbs the sum and difference patterns, so that the ratios of the sum and difference signals no longer accurately represent the off-axis angle of the target. The ratio of the adapted sum and difference signal is generated, and applied to a monopulse angle determining arrangement, in which one of a plurality of different error angle functions or curves is selected in response to the weighting signals, and the adapted sum/difference ratio is applied to the selected curve to determine the monopulse angle.

7 Claims, 10 Drawing Sheets

MAINBEAM JAMMER NULLING WITH MONOPULSE ANGLE CORRECTION

BACKGROUND OF THE INVENTION

This invention relates to range and angle location systems such as radar, and more particularly to such systems in which monopulse techniques are used to determine the location of targets, and in which a source of jamming signals is located at an angle near that of the target.

Radar systems use a transmitting antenna to transmit signals toward a target, and use a receiving antenna to receive echo signals reflected from the target. The receiving antenna may be collocated with the transmitting antenna, or it may be at a different location. When collocated, portions of the antenna structure may be common to both the transmitting and receiving functions. Early radar systems depended upon the use of a narrow beamwidth receiving antenna beams to aid in determining the actual azimuth of the target. Extremely narrow receiving beams tend to limit the scan rate of the system, because the receive beam must dwell at each angle for a sufficiently long time to receive an identifiable echo. A more modern scheme for determining the target azimuth angle uses monopulse techniques, in which sum and difference signals are generated from the received antenna signal. The sum signal corresponds to a conventional single-lobe beam, while the difference signal includes an on-axis null, so that a predetermined ratio of sum- and difference-beam amplitudes can be used, when near the sum-beam axis, to determine the off-axis angle. The difference pattern has a 180° mutual phase shift between its adjacent lobes, and the side (left, right or up, down) of the central or boresight axis on which the target resides can be determined from the phase shift. This monopulse scheme is highly effective and widely used.

Numerous schemes have been used to suppress or reduce the effects of interference or intentional jamming of radar systems. Sidelobe cancelers of various types are well known. Copending patent application Ser. No. 07/644,358, filed Jan. 22, 1991 in the name of Kott, describes an arrangement for nulling the beam of an array antenna to reduce jamming. An improved interference suppression scheme is desired.

SUMMARY OF THE INVENTION

A method and apparatus for target locating and ranging includes a transmitter for transmitting a signal toward a target. A monopulse receiving arrangement responds to signal echoes from the target by generating received monopulse sum and difference signals. An auxiliary receiving arrangement, which may be simply a second feed adjacent to the monopulse feed of a reflector, responds to signal echoes from the target by generating a received auxiliary signal. A first weighting signal generator responds to the received monopulse sum and auxiliary signals to generate a first weighting signal which, when multiplied by the auxiliary signal, results in a first weighted auxiliary signal approximately equal in magnitude and in a predetermined phase relative to the received sum signal. In a particular embodiment of the invention, the predetermined phase is in-phase. A second weighting signal generator responds to the difference and auxiliary signals to generate a second weighting signal which, when multiplied by the auxiliary signal, results in a second weighted auxiliary signal approximately equal in magnitude and in a predetermined phase relative to the received difference signal. The auxiliary signal is weighted with the first and second weighting signals to produce first and second weighted auxiliary signals. The first weighted auxiliary signals are summed with the received sum signals to produce adapted sum signals. The second weighted auxiliary signals are summed with the received difference signals to produce adapted difference signals. The jamming signal is nulled by the summing operation, creating an effective null in the receive monopulse radiation pattern at the location of the jammer. The null distorts the pattern, resulting in errors in determining the target location. An adapted monopulse ratio signal is generated, representing the ratio of the adapted difference signal divided by the adapted sum signal. One of a plurality of monopulse error functions or curves, appropriate to the location of the null, is selected in response to the adapted monopulse ratio. The adapted monopulse ratio signal is applied to one of the error functions for determining the angle of the target from said central axis.

DESCRIPTION OF THE INVENTION

Figure 1:
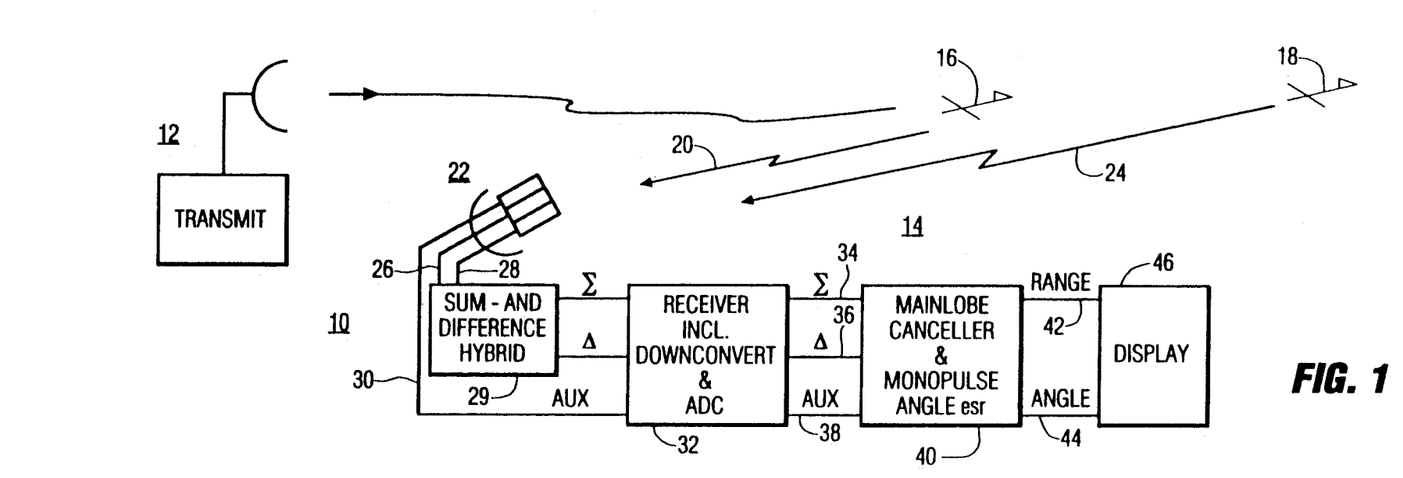
FIG. 1 is a simplified block diagram of a monopulse radar system in accordance with the invention.

In FIG. 1, a radar system designated generally as 10 includes a transmitter designated 12 and a receiver-processor 14. Transmitter 12 transmits electromagnetic signals toward a target 16, the range and direction of which are to be determined. Echo signals 20 reflected from target 16 are returned to a receive antenna 22, described in further detail below. A barrage jammer 18 at an azimuth, elevation or combined angle near that of target 16 produces jamming signals illustrated as 24, which also enter receive antenna 22. Those skilled in the art know that the transmissions of the transmitter are synchronized with the receiver functions, and that the transmit antenna may also perform the receive functions. Receive antenna 22 is arranged to produce two beams symmetrically offset from the boresight axis (0°), as illustrated by beams 410 and 412 of FIG. 4, and it also produces an auxiliary beam further offset from the boresight axis, represented as 414 in FIG. 4. The signals associated with beam 410 of FIG. 4 are coupled from antenna 22 of FIG. 1 by a transmission path 26, the signals associated with beam 412 are coupled out by a transmission path 28, and the signals associated with beam 414 of FIG. 4 are coupled from antenna 22 by a transmission path 30.

Figure 4:
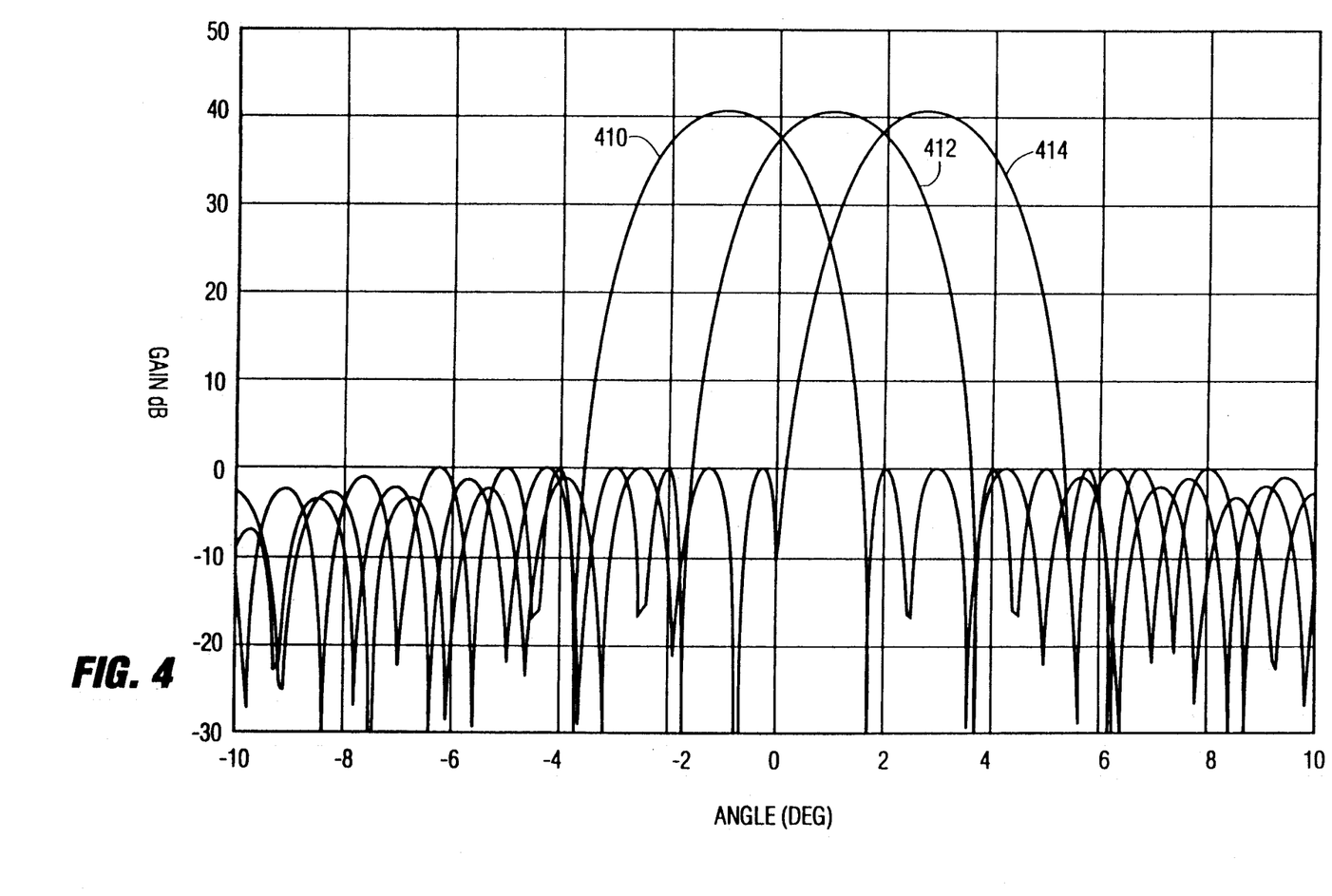
FIG. 4 is a representation of the receive radiation patterns of the antenna of FIG. 2.

The signals coupled from antenna 22 over paths 26 and 28, representing beams 410 and 412 of FIG. 4, are applied to a sum-and-difference circuit 29, which as known may be a hybrid circuit. Hybrid circuit 29 produces sum and difference signals on correspondingly designated transmission paths in FIG. 1.

The sum, difference and auxiliary beam signals are applied to a block 32 representing a receiver, which may include known downconverters, analog-to-digital converters (ADCs) and other conventional devices, which produces received sum, difference and auxiliary signals on data paths 34, 36 and 38, respectively. The received sum, difference and auxiliary signals are applied from receiver 32 to a mainlobe canceler and monopulse angle estimator (processor) 40 according to the invention. Mainlobe canceler and monopulse angle processor 40, when operative during jamming, processes the sum, difference and auxiliary signals to produce an effective receive beam null in the direction of the jammer, while maintaining monopulse operation. Thus, block 40 also produces an estimate of the target position relative to the boresight axis, which is known as the monopulse angle estimate. The monopulse angle estimate is produced on a data path 44, and is combined with the boresight angle information, available from a receive antenna pointing apparatus, not illustrated, to produce a combined angle signal which represents the target angular position. The target angular position is displayed, together with range information, obtained in conventional manner and applied over a data path 42, by a display unit 46.

Figure 2:
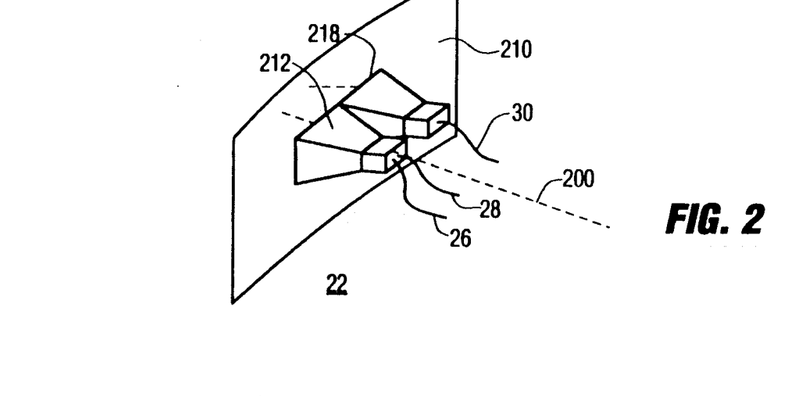
FIG. 2 is a simplified representation of a reflector antenna with a monopulse feed horn and an auxiliary beam feed horn which may be used in the arrangement of FIG. 1.

FIG. 2 is a perspective or isometric view of antenna 22 of FIG. 1. Elements of FIG. 2 corresponding to those of FIG. 1 are designated by like reference numbers. In FIG. 2, a reflector illustrated as 210 has a monopulse horn feed 212 on its boresight axis 200, for producing receive beams 410 and 412 of FIG. 4 on transmission paths 26 and 28. Another feed horn 218 is offset from axis 200, and produces signals on transmission path 30 representing reception on beam 414 of FIG. 4.

Figure 3:
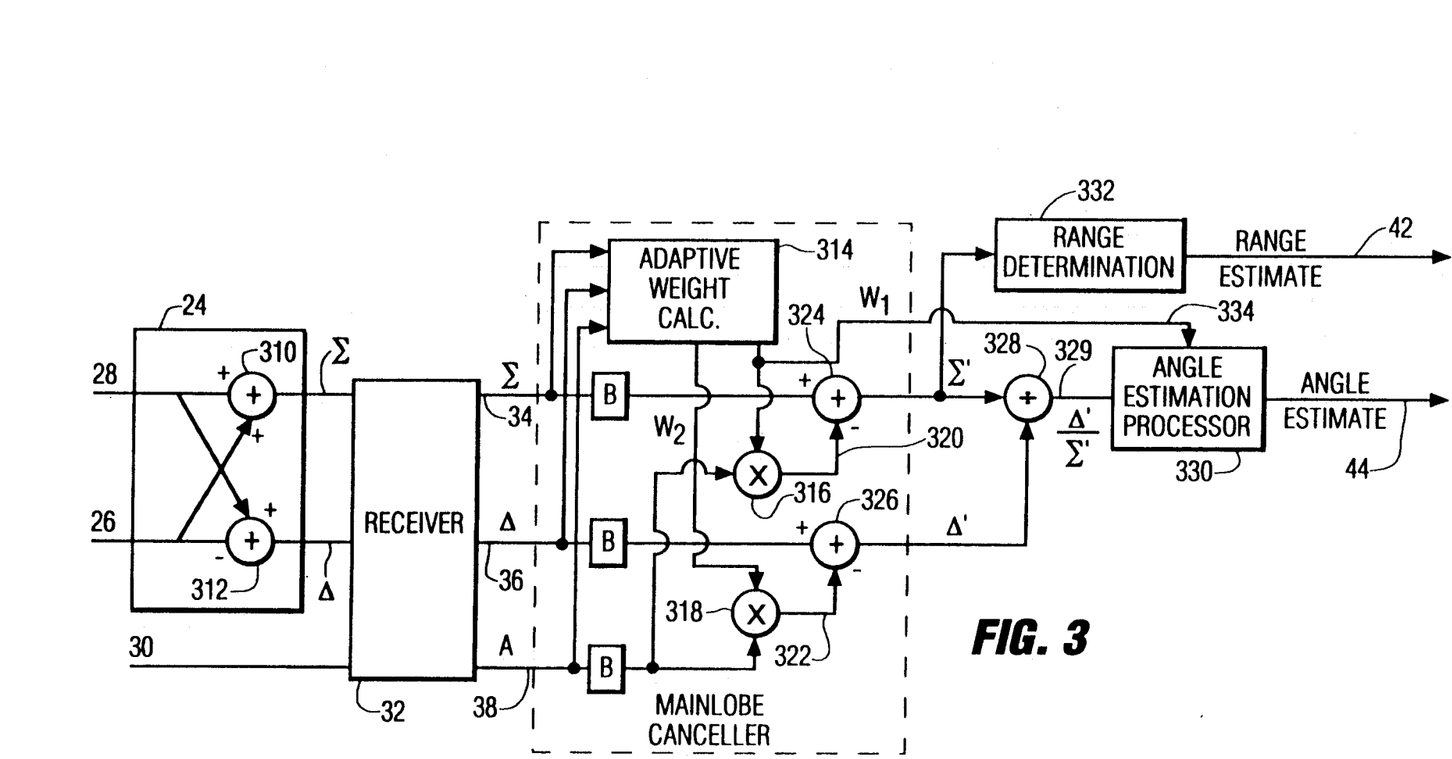
FIG. 3 is a more detailed block diagram of a portion of the radar of FIG. 1.

FIG. 3 represents portions of FIG. 1, and corresponding elements are designated by like reference numerals. In FIG. 3, sum-and-difference block 29 is illustrated as including first and second summing circuits 310 and 312, with the signals from transmission path 28 being applied to the noninverting (+) input terminals of summing circuits 310 and 312. The signals from transmission path 26 are applied to the inverting (−) input terminal of summing circuit 312 and to the noninverting input terminal of summing circuit 310. Complex digital baseband sum and difference signals are produced on $\Sigma$ and $\Delta$ data paths.

The baseband sum, difference and auxiliary signals from receiver 32 of FIG. 3 are applied simultaneously on data paths 34, 36 and 38 to an adaptive weight calculation block 314 and to a plurality of buffers (B), not separately designated, which delay the signals until the weights have been generated, and which generally maintain time correspondence in the processing. First and second weighting signals (W1 and W2) generated by calculation block 314 in response to the sum, difference and auxiliary signals are applied to complex multipliers 316 and 318, respectively, together with the auxiliary signal. Multipliers 316 and 318 multiply the auxiliary signals, received from the appropriate buffer B, by weighting signals W1 and W2, respectively, to produce weighted auxiliary signals on data paths 320, 322, respectively, for application to summing circuits 324 and 326, respectively. Summing circuits 324 and 326 vectorially sum (sum amplitude, taking phase into account) the weighted auxiliary signals with the (buffered) sum and difference signals from receiver 32, to produce adapted sum ($\Sigma'$) and adapted difference ($\Delta'$) signals for application to a dividing circuit 328. The $\Sigma'$ and $\Delta'$ signals, as described below, have a null at the jammer location, and may have distorted radiation patterns.

Dividing circuit 328 of FIG. 3 forms the ratio of the adapted difference signal $\Delta'$ divided by the adapted sum signal $\Sigma'$, and applies the ratio $\Delta'/\Sigma'$ to an angle estimation processor 330. Processor 330 also receives weighting signal W1 over a data path 334 from weight calculator 314. Processor 330 produces the desired monopulse angle estimate for the distorted $\Sigma'$ and $\Delta'$ patterns. The estimate is applied over data path 44 to be combined with the boresight angle, as described above.

Also in FIG. 3, a conventional range determination circuit or processor illustrated as a block 332 receives adapted sum signals from summing circuit 324, and produces the desired target range determination on data path 42 for application to the display unit of FIG. 1.

Figure 5:
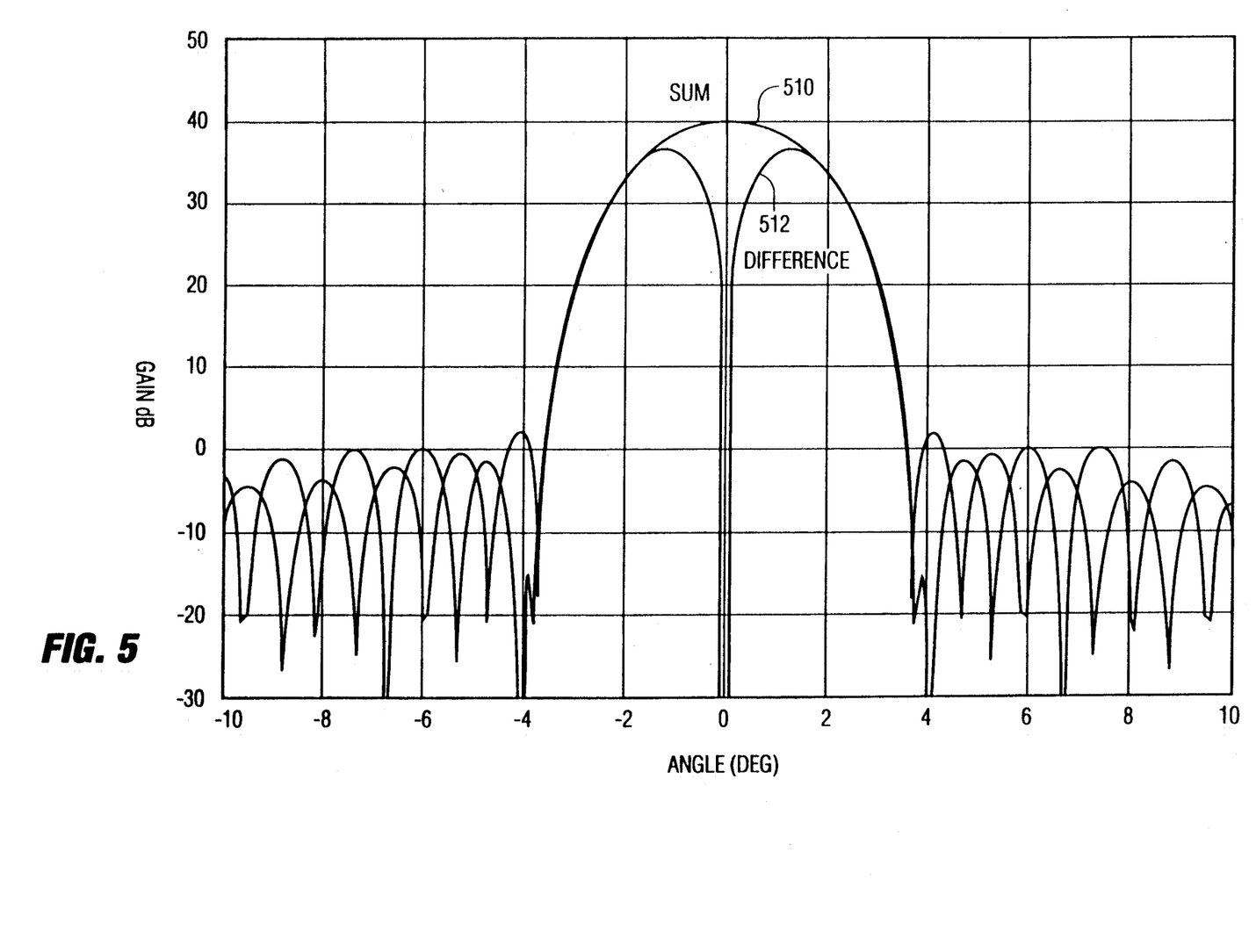
FIG. 5 represents the beams of FIG. 4 processed, as by a hybrid circuit, to form sum ($\Sigma$) and difference ($\Delta$) receive beams.
Figure 6:
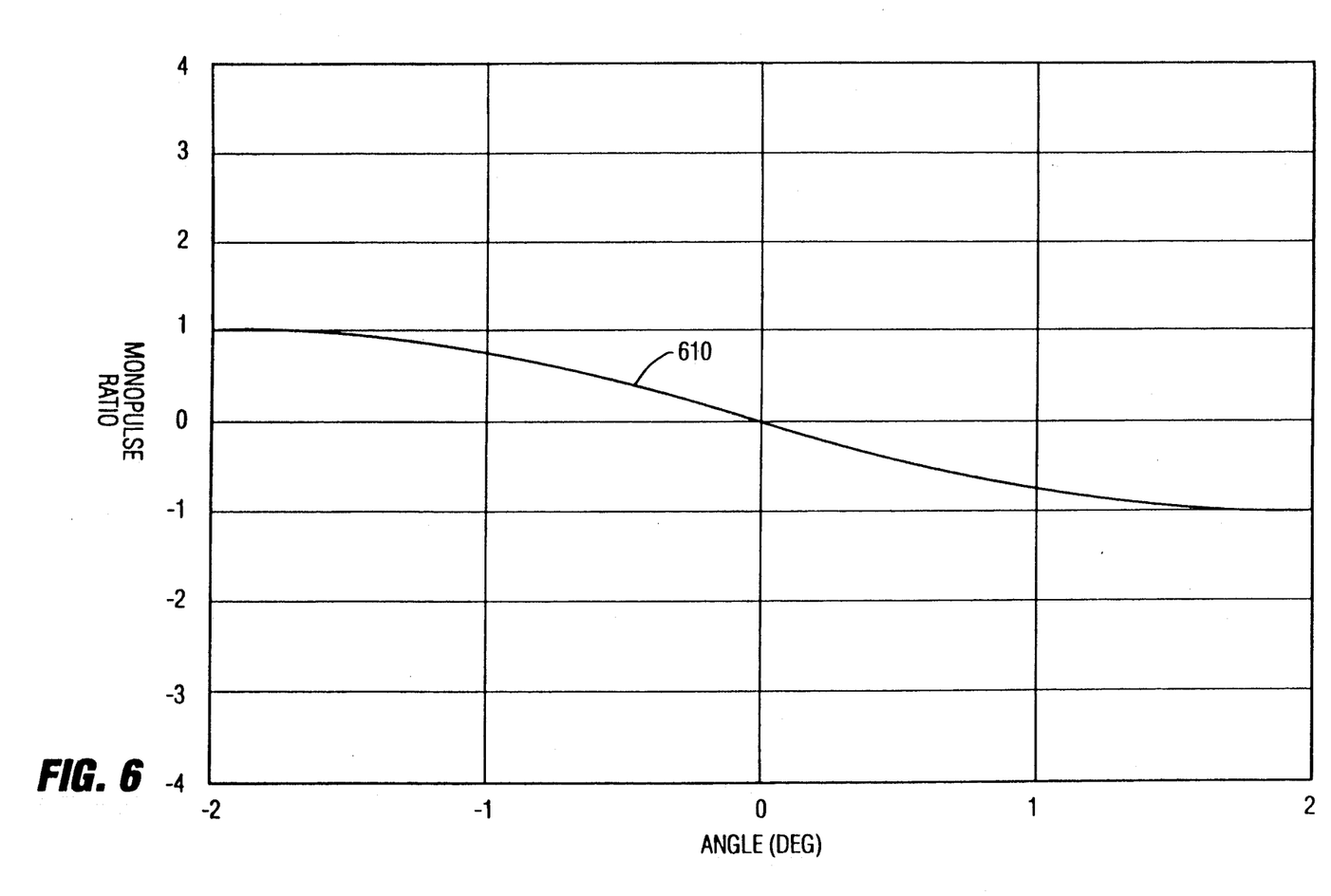
FIG. 6 is a plot of the off-axis or monopulse error for the beams of FIG. 5.

FIG. 5 illustrates the effective monopulse receive beams represented by the sum and difference signals at, for example, the output of receiver 32 of FIG. 3, in the absence of jamming. In FIG. 5, the sum beam is curve 510, and the difference beam is 512. The difference beam, as known, has a null on the boresight axis (0° in FIG. 5). The 3-dB beamwidth of the sum beam is about 2 degrees. Monopulse techniques, as known, allow the angular location of the target to be determined by the ratio of the sum and difference beams in the region of the difference-beam null. Plot 610 of FIG. 6 represents the difference-to-sum voltage ratio as a function of angle away from boresight for the sum and difference patterns of FIG. 5. As mentioned, phase information (not illustrated) is used to determine which side of the boresight the target lies on.

Figure 7:
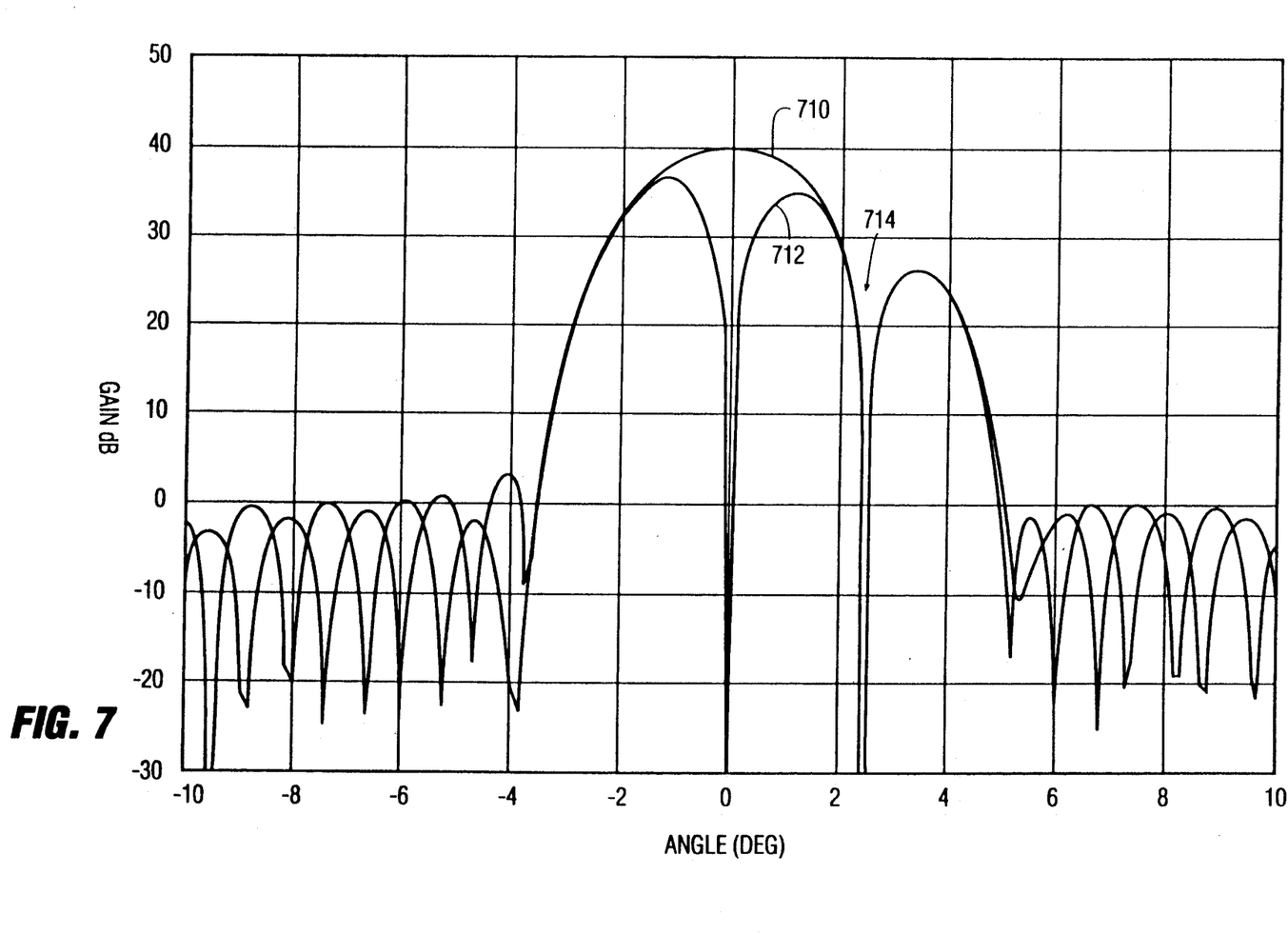
FIG. 7 is a plot of the receive radiation pattern of the beams of FIG. 4 processed to form a null about 2.5° from the boresight axis.

In the presence of a barrage jammer in the main lobe of either the sum or difference pattern, the jamming power may exceed that of the target echo. This may result in concealing the target. In accordance with the invention, adaptive weighting calculator 314 of FIG. 3 calculates weights W1 and W2 so that, when the auxiliary signal arising from auxiliary beam 414 of FIG. 4 is multiplied either weight W1 or W2 in multipliers 316 and 318, the resulting weighted auxiliary signals are equal in amplitude, and in a particular phase relationship, relative to the sum and difference signals, respectively. More particularly, the complex weights are selected to cause the relative phase of the weighted auxiliary signal to be such that, when the weighted auxiliary signal is added to the corresponding one of the sum and difference signals, the jamming in the sum and difference signals are cancelled. Thus, if summing circuit 324 of FIG. 3 were an adder with two noninverting input ports, weighting signal W1 would be selected to produce a weighted auxiliary signal which is equal in amplitude and out-of-phase with the sum signal arriving at summing circuit 324. On the other hand, if, as illustrated in FIG. 3, summing circuit 324 receives the sum signal at a noninverting input port and the weighted auxiliary signal at an inverting input port, the appropriate weight W1 causes the weighted auxiliary signal to be equal in amplitude and in-phase with the sum signal. Thus, since the jamming signal is assumed to be much larger than the desired echo from target 16 of FIG. 1, all or almost all of the jamming signal is cancelled in summing circuit 324. Adaptive weight calculator 314 of FIG. 3 calculates weight W2 in a similar fashion, so that the jamming component of the difference signal at the output of summing circuit 326 is cancelled. The result of this process, in response to a jammer at 2.5 degrees off-boresight, is illustrated in the effective receive patterns of FIG. 7. In FIG. 7, the sum pattern is illustrated as 710, and the difference pattern by 712. Both the sum and difference patterns exhibit a deep null, illustrated as 714, at the angle of the jammer. Thus, the jammer signal is not effective in producing a response by the radar system. At angles within the 3-dB beamwidth, however, which is where the target is located, the beams are almost unperturbed, and ordinary monopulse operation can continue, using the monopulse error curve of FIG. 6.

Figure 8:
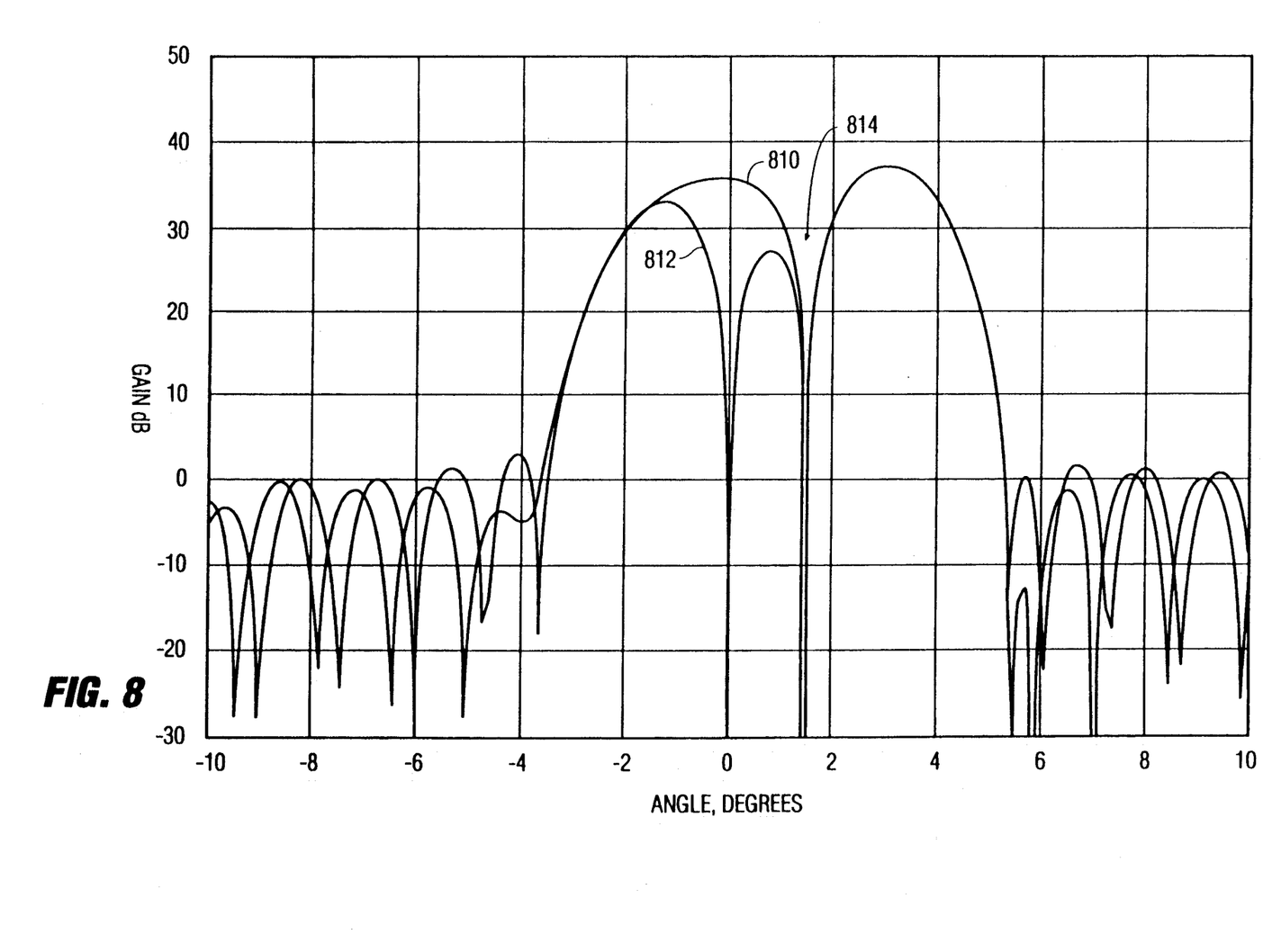
FIG. 8 is similar to FIG. 7, except in that the null is at 1.5° relative to the boresight axis.
Figure 9:
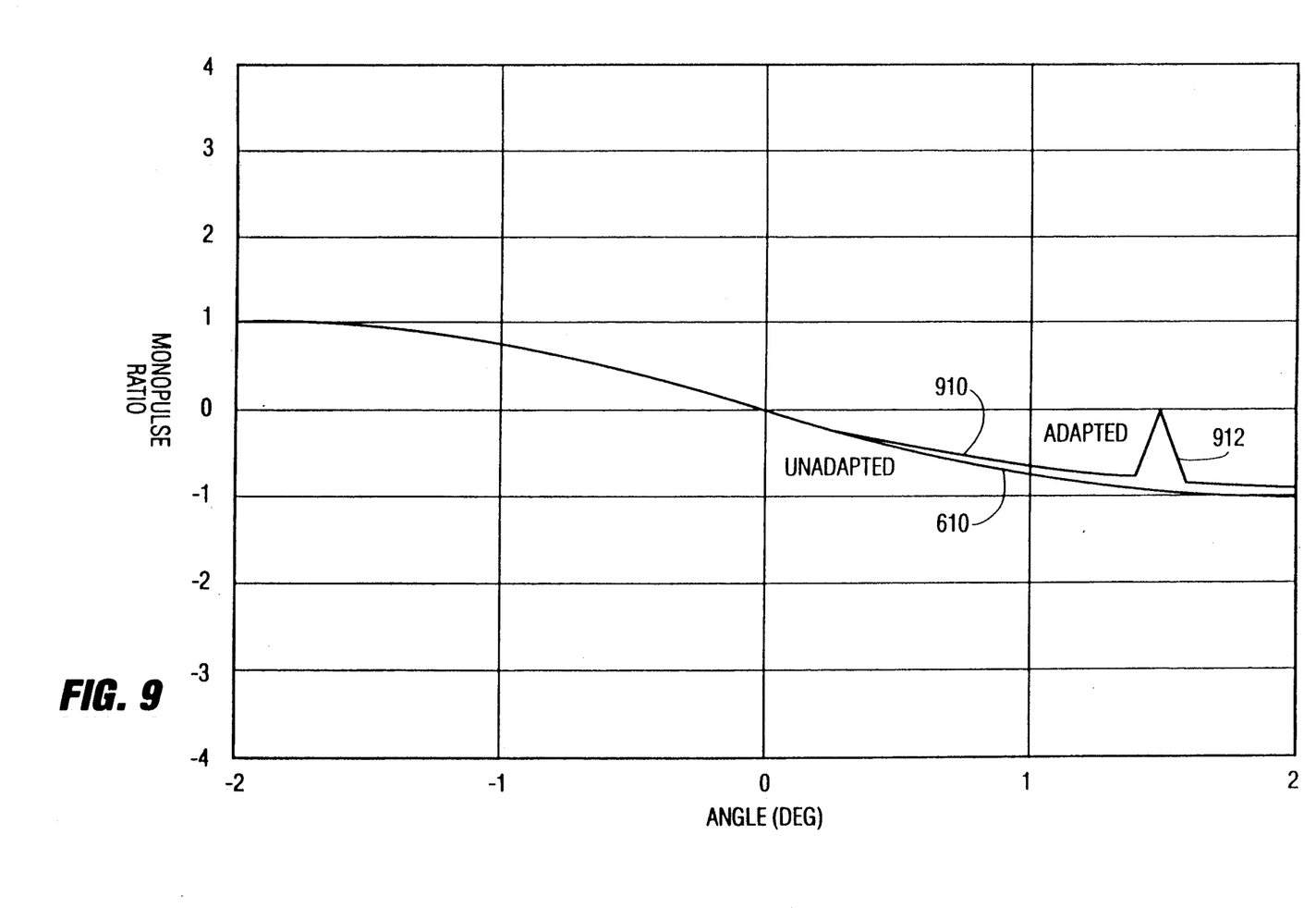
FIG. 9 is a plot of the monopulse error curve for the pattern of FIG. 8, with the plot of FIG. 6 for reference.

FIG. 8 illustrates plots of the effective receive sum and difference patterns in the presence of a jammer at 1.5 degrees off-boresight. As illustrated in FIG. 8, the sum beam is 810 and the difference beam is 812. The null at the jammer location is designated 814. The sum and difference patterns are distorted, so that the ratios of FIG. 6 no longer allow accurate identification of the monopulse angle. FIG. 9 illustrates the adapted monopulse error curve 910, with the unadapted curve 610 for reference. This curve is readily made from plots of the antenna response in the presence of the null. As illustrated in FIG. 9, the monopulse difference-to-sum voltage ratio of the nulled pattern is different from that of the un-nulled pattern which would be used in the absence of a jammer. Consequently, errors in determining the angle of the desired target occur when the presence of a jammer requires that the pattern be nulled. A "bump" 912 occurs in monopulse error curve 910 at the location of the jammer. This bump is of no consequence, because a target at the 1.5° off-boresight location of the jammer would be in the jammer null, and the echo signals would be so weak that the target location would be noisy.

Figure 10:
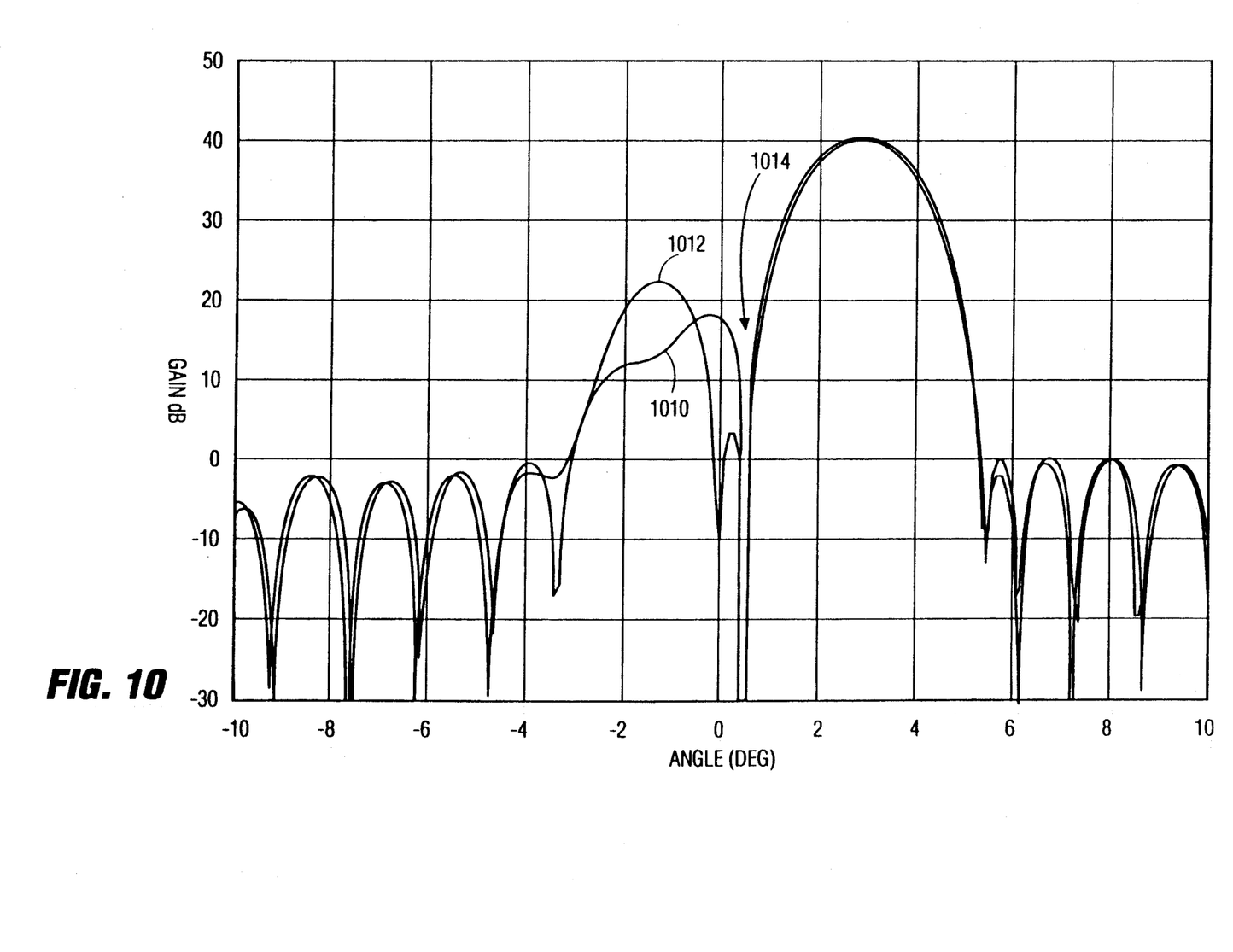
FIG. 10 is a plot corresponding to that of FIG. 7, except in that the null at about 0.5° relative to the boresight.
Figure 11:
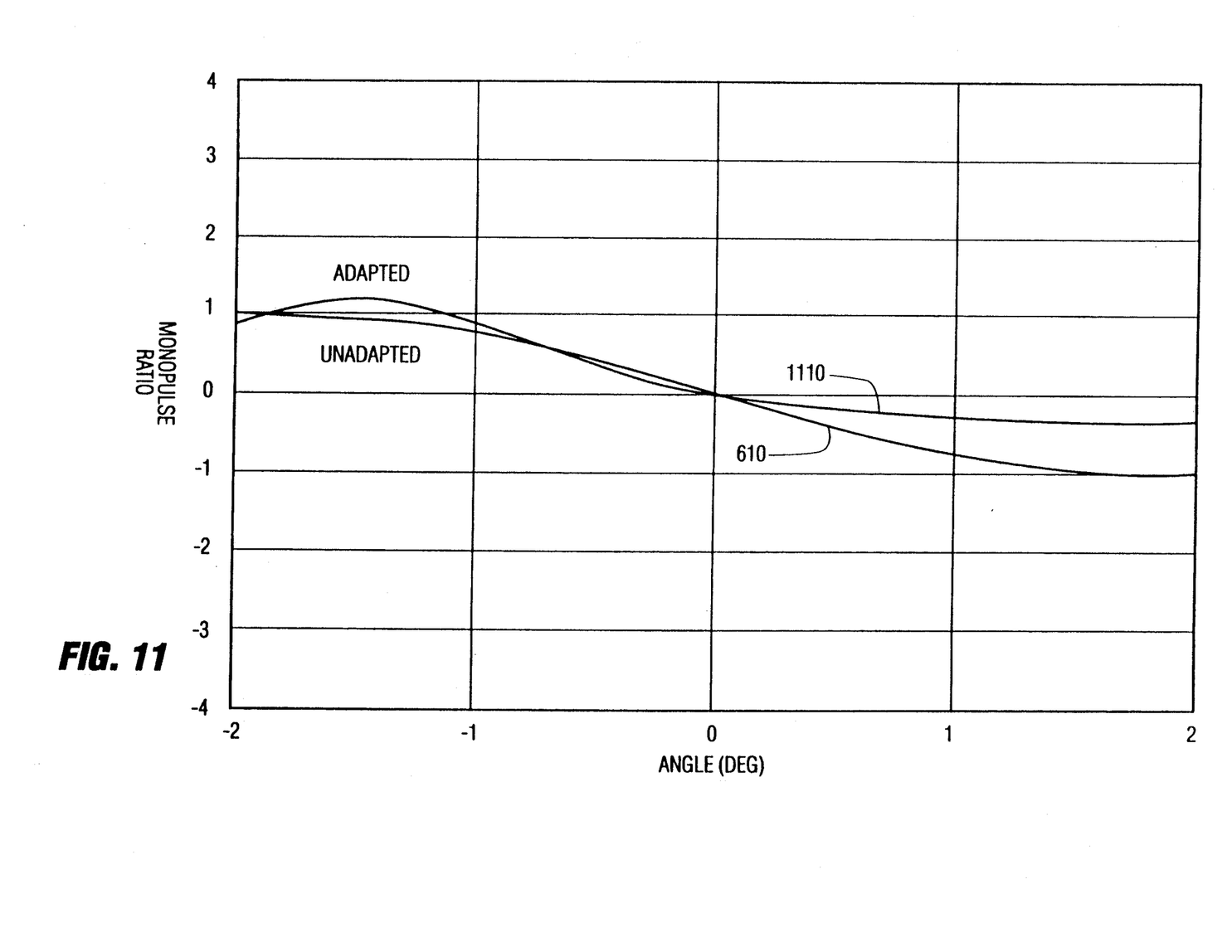
FIG. 11 is a plot of the monopulse error curve for the pattern of FIG. 10.

As a further example of the beam distortion arising from the nulling which reduces the effects of jamming, refer to FIG. 10, in which the sum beam is 1010, the difference beam is 1012, and the jammer is at an off-boresight angle of 0.5 degrees. The null produced by the weighting and summing, described above, is designated 1014. While the jamming signal is nulled, the sum and difference patterns near boresight are badly distorted. Plot 1110 of FIG. 11 represents the monopulse error curve calculated for the distorted patterns of FIG. 10, together with curve 610 for reference. As illustrated in FIG. 11, the monopulse error curve is still monotonic with ±1°, and can provide useful information. In accordance with an aspect of the invention, correction for the errors occasioned by the beam distortion is provided.

For the case of a jammer located at an angle off-boresight of about 2.5 degrees, the jammer signal occurs at or near the peak of the auxiliary beam (414 of FIG. 4), and produces a maximum response from the auxiliary beam. At 2.5°, the jammer is about 15 dB below the beam peak of the sum and difference patterns, so only a small magnitude of weight W1 is required to cause the auxiliary jammer signal to equal the magnitude of the sum jammer signal, for cancellation to occur. As the jammer source moves closer in angle to the desired target, the jammer signal moves off the peak of the auxiliary beam, so that auxiliary beam jammer signal decreases in magnitude, and at the same time the jammer signal response of the sum beam increases, thereby requiring a much greater magnitude of weight W1 for cancellation to occur. The magnitude of W2 does not change as much, because, in the regions of interest, the difference beam response decreases with angles closer to boresight. Thus, there is a one-to-one relationship between the magnitude of weight W1 and the off-boresight angle of the jammer, and therefore there is a corresponding relationship between the magnitude of weight W1 and the distortion of the error curve. For each different magnitude of W1, a different distorted error curve is used to determine the target angle from boresight.

Referring once again to FIG. 3, weight W1 is coupled from weight calculator 314 to angle estimation processor 330. Processor 330 uses the magnitude component of W1 to select or calculate an appropriate error curve. The adapted monopulse ratio produced by dividing circuit 328 of FIG. 3 is then applied to the selected or calculated monopulse error curve to determine the target angle from the boresight axis in the presence of the jammer and nulling pattern distortion which it causes.

Weights are calculated in weight calculator 314 of FIG. 3 by performing a summation, over said number N of range samples, of the product of sum and auxiliary signal samples, and also performing a summation, over the same number N of range samples, of the magnitude-squared of the auxiliary signal samples, and then taking the ratio of the two summations to form weight W1

$$W1 = \left(\sum_{i=1}^{N} \epsilon(i)A^*(i)\right) / \left(\sum_{i=1}^{N} A(i)A^*(i)\right)$$

where
$\Sigma(i)$ represents the sum signal samples in each range sample
$A(i)$ represents the auxiliary signal samples in each range sample; and
$A^*(i)$ is the complex conjugate of $A(i)$.
Weight W2 is calculated by $$W2 = \left(\sum_{i=1}^{N} \Delta(i)A^*(i)\right) / \left(\sum_{i=1}^{N} A(i)A^*(i)\right)$$

where
$\Delta(i)$ represents the difference signal sample in each range sample.

Figure 12:
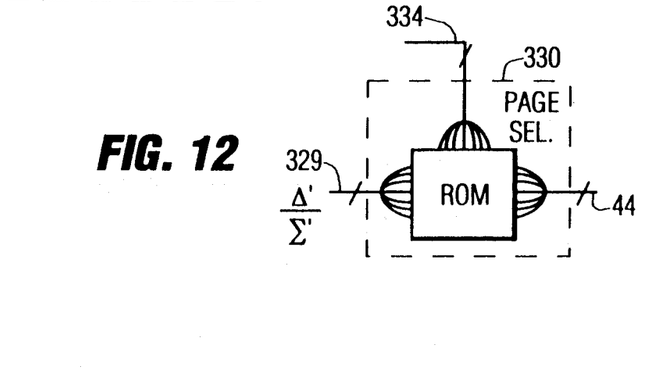
FIG. 12 illustrates a page-addressed ROM useful in the system of FIG. 3.

Angle estimation processor 330 of FIG. 3 may be implemented as a ROM look-up table, as in FIG. 12, using the adapted monopulse ratio as the address in a "page" selected by the magnitude of W1. The values of the error curve are preloaded into each page, and within the error curve selected by the page, the ratio is determined by $\Delta'/\Sigma'$. For example, when the magnitude of weight W1 is zero, there is no jamming, so the corresponding page of ROM is pre-loaded with the standard monopulse error curve of FIG. 6. For any other magnitude of W1, monopulse error curves appropriate to the effective receive beam patterns are preloaded into ROM. If the beam patterns can be correctly represented by a mathematical equation or by a computer simulation, the appropriate error curve can be readily determined mathematically or by a simple computer process. To the extent that a physical antenna is not so represented, measured radiation patterns may be made, and the appropriate ratios may be extracted for each of a number of angle increments, to thereby form a family of curves. However determined, the resulting values are stored in the ROM associated with processor 330, and are then available for use.

As an alternative to pre-storing a plurality of monopulse error curves in a ROM, the appropriate error curve can be calculated on the fly by appropriate processing. In particular, the error curve can be calculated by use of a polynomial approximation. The target angle estimate $\theta_e$ is $$\theta_e = \sum_{j=0}^{N} \sum_{i=0}^{N} C_{ij} W1^i r^j$$

where
W1 has been defined;
$W1^i$ is the $i^{th}$ power of W1;
r is the $\Delta'/\Sigma'$ monopulse ratio;
$r^j$ is the $j^{th}$ power of r;
$C_{ij}$ is the polynomial coefficient for the ij term, selected to give a close fit; and
N is the order of the two-dimensional polynomial.

As so far described, the jammer has been assumed to be on the same side of the boresight axis as the auxiliary beam. If the jammer is on the opposite side, a second auxiliary beam is generated on the side with the jamming signals, by a second auxiliary beam feed horn similar to horn 218 of FIG. 2, which second feed is located on the opposite side of the boresight axis. Selection of the appropriate one of such auxiliary beams may be performed with the aid of a jamming angle map generated by the radar system as part of its normal operation.

Other embodiments of the invention will be apparent to those skilled in the art. For example, the described system provides monopulse location only in azimuth. Similar principles apply to elevation operation, and two-dimensional (az-el) operation will be an obvious variant. Those skilled in the art will recognize that the monopulse locating technique is not applicable at angles far from boresight, but that jammer nulling may not be necessary when the jammer is far from the main beams. Instead of a horn-fed reflector, an array antenna with beamformers, or an active array antenna may be used. Corresponding principles may be applied to sonar and other location systems in which the transducer patterns provide corresponding capabilities.

What is claimed is:

1. A target locating and ranging system, comprising:
    means for transmitting signal toward a target;
    monopulse receiving means for generating sum and difference monopulse receiving beams directed along a boresight axis, and for responding to signal echoes from said target with received sum and difference signals;
    auxiliary receiving means associated with said monopulse receiving means for generating an auxiliary receiving beam directed at an angle relative to said boresight axis, and for responding to signal echoes from said target with a received auxiliary signal;
    weighting signal generating means coupled to said monopulse receiving means and to said auxiliary receiving means for processing received sum, difference and auxiliary signals in the presence of unwanted signals for generating a first weighting signal which, when multiplied by said auxiliary signal, results in a first weighted auxiliary signal approximately equal in magnitude and in a predetermined phase relative to said sum signal, and for generating a second weighting signal which, when multiplied by said auxiliary signal, results in a second weighted auxiliary signal approximately equal in magnitude and in a predetermined phase relative to said difference signal;
    weighting means coupled to said monopulse receiving means, to said auxiliary receiving means, and to said weighting signal generating means, for weighting said auxiliary signal with said first and second weights to produce said first and second weighted auxiliary signals;
    summing means coupled to said weighting means and to said monopulse receiving means for summing said first weighted auxiliary signals with said received sum signals to produce adapted sum signals, and for summing said second weighted auxiliary signal with said received difference signals to produce adapted difference signals, thereby generating a null in the effective sum and difference beams at the location of said unwanted signal, but thereby distorting said effective sum and difference beams;
    ratio generating means coupled to said receiving means and to said auxiliary receiving means for generating an adapted monopulse ratio signal representing the ratio of said adapted difference signal divided by said adapted sum signal;
    signal processing means coupled to said weighting signal generating means and to said ratio generating means for selecting one of a plurality of monopulse error functions in response to said adapted monopulse ratio, and for applying said adapted monopulse ratio signal to said one of said error functions for determining the angle of said target from said boresight axis.

2. A system in accordance with claim 1, wherein said monopulse receiving means comprises reflector means and monopulse feed means directed toward said reflector means along said boresight axis, and said auxiliary receiving means comprises second feed means located adjacent to said monopulse feed means.

3. A system in accordance with claim 2, wherein said monopulse feed means comprises a monopulse feed horn.

4. A system in accordance with claim 3, wherein said second feed means comprises a horn.

5. A system in accordance with claim 1, wherein said signal processing means comprises addressable memory means.

6. A system in accordance with claim 5 wherein said addressable memory means comprises a ROM.

7. A method for target locating and ranging, comprising the steps of:

transmitting signal toward a target;

responding to signal echoes from said target by generating received monopulse sum and difference signals;

responding to signal echoes from said target by generating a received auxiliary signal;

generating a first weighting signal which, when multiplied by said auxiliary signal, results in a first weighted auxiliary signal approximately equal in magnitude and in a predetermined phase relative to said received sum signal;

generating a second weighting signal which, when multiplied by said auxiliary signal, results in a second weighted auxiliary signal approximately equal in magnitude and in a predetermined phase relative to said received difference signal;

weighting said auxiliary signal with said first and second weighting signals to produce said first and second weighted auxiliary signals;

summing said first weighted auxiliary signals with said received sum signals to produce adapted sum signals;

summing said second weighted auxiliary signal with said received difference signals to produce adapted difference signals;

generating an adapted monopulse ratio signal representing the ratio of said adapted difference signal divided by said adapted sum signal;

selecting one of a plurality of monopulse error functions in response to said adapted monopulse ratio;

applying said adapted monopulse ratio signal to said one of said error functions for determining the angle of said target from said central axis.

* * * * *